INVENTORS
MASAHIRO IZUMI,
HIROSHI SHIMA,
SHIGERU MATSUMURA &
NOBUYUKI ASANO
BY
CAROTHERS & CAROTHERS
THEIR ATTORNEYS

United States Patent Office 3,546,182
Patented Dec. 8, 1970

3,546,182
LINER POLYMERIC COMPOSITIONS, METHOD OF MANUFACTURING THEM AND PRODUCTS MADE FROM THEM
Masahiro Izumi and Hiroshi Shima, Osaka, Shigeru Matsumura, Nishinomiya-shi, and Nobuyuki Asano, Takarazuka-shi, Japan, assignors to Sumitomo Electric Industries, Ltd., Osaka, Japan, a company of Japan
Continuation-in-part of application Ser. No. 410,782, Nov. 12, 1964. This application Dec. 18, 1967, Ser. No. 691,500
Int. Cl. B44d 1/42; C08g 20/00
U.S. Cl. 260—78.4                    7 Claims

ABSTRACT OF THE DISCLOSURE

A polymeric composition produced by dissolving a tricarboxyl acid anhydride mono-acid halide or a tricarboxyl acid mono-ester diacid halide in an organic solvent separate reactions, and thereafter permitting their synthesis under controlled temperature conditions to eliminate fluctuation of the specific viscosity of the polymer and the formation of an adduct therefrom.

CROSS-REFERENCES TO RELATED APPLICATIONS

Patent application Ser. No. 410,782, filed Nov. 12, 1964 now abandoned, for Linear Polymeric Compositions, method of manufacturing them and products made from them, this application being a continuation-in-part of that application.

BACKGROUND OF INVENTION

This invention relates generally to linear polymeric compositions and the method of manufacturing the same.

A considerably large number of polymers are now known which can be formed into films and fibers for use in the manufacturing of polymeric coating materials, laminates, etc. However, there is a limited number of polymers today that can be manufactured successfully on a large scale, as is necessary in industry, in view of various technical problems that arise, such as, control of the temperature of a large polymeric mass and the degree of fluctuation of the specific viscosity of the polymer. Also such technical properties are such that some polymers have a low thermal softening point and become readily deformed thermally, while others have too high a softening point or even may not show any thermal softening point and therefore are incapable of heat plastic molding or readily formed into electric insulating materials. Also, certain kinds of polymers are incapable of being readily soluble in any solvent so that they are not capable of being given a desired shape.

What is needed is a polymeric composition being of high molecular material possessing excellent insulation properties and yet adaptable for use at elevated temperatures.

The present invention is directed to the producing of polymeric compositions free from the above mentioned drawbacks but yet possess a high heat resistant property necessary for good electric insulating material.

The introduction of an imide group to such polymeric compositions is aimed at improving the heat resistant characteristic of the polymer and, thus, improve its adaptability as an electric insulating material. Although the use of this group provides a polymer with an excellent heat resistant characteristic, it has poor workability and poor resistance to alkaline substances.

SUMMARY OF INVENTION

The preesnt invention utilizes the heat resistant characteristic of polyimide and improves its workability and alkali resistance through the introduction of amide linkages.

The present invention is directed to the large scale production of polyamide-acid by causing a dehydrogenhalide reaction and an additional reaction of an acid anhydride group by ring opening taking place simultaneously through the reaction of tricarboxylic acid anhydride mono-acid halide which contains a trivalent radical having at least two carbon atoms and diamine which has at least two carbon atoms. The carboxyl groups of the aforementioned tricarboxylic acid anhydride mono-acid halide are each bonded to different carbon atoms of the trivalent radical, and at least two carboxyl groups of them are bonded to adjacent carbon atoms to form a five membered ring of acid anhydride, while the carbon atom, which is bonded to the acid halide group, is preferably separated from the carbon atom bonded to a carboxyl group by at least one carbon atom.

The present invention also is directed to the large scale production of polyamide-ester through a dehydrogen halide reaction by causing tricarboxylic acid mono-ester diacid halide, which contains a trivalent radical having at least two carbon atoms, and diamine, which has at least two carbon atoms, to react with each other. It is necessary that the carboxyl groups of the tricarboxylic acid mono-ester diacid halide are each bonded to different carbon atoms of the trivalent radical and that one of the halide groups is bonded to the carbon atom adjacent to a carbon atom to which there is bonded an ester.

Thus, the present invention relates to a method of producing, on a large scale production basis, a polyamic acid or polyamic ester by causing tricarboxyl acid anhydride mono-acid halide or tricarboxyl acid mono-ester di-acid halide to react with an organic diamine. These tricarboxyl acids are dissolved in a solvent without the formation of an adduct. An example of the desired type of solvent is a aromatic hydrocarbon, such as, benzene and toluene. After the tricarboxylic acid has been dissolved in the solvent, the solution is slowly stirred into a solution of an organic primary diamine for reaction.

An important feature of the present invention is the ability to produce polymeric acid or ester on a large commercial scale without the formation of an adduct, the latter of which would have to be separated from the main reactant medium.

Another important feature of the present invention is controlling the reaction temperature in the production of polyamic acid or ester in order to obtain a stabilized product where this polymeric material is being industrially produced on a large scale and also obtain a polymer of high polymerizataion degree not before known in the large scale production of polyamic acid or ester.

The method herein provides an additional advantage in that the polyamic acid or polyamic ester produced by polymerization has in its side chains of carboxyl radical or ester radical that is not reacted upon resulting in a remarkable improvement in the solubility of the polymer.

Other objects and advantages appear hereinafter in the following specification and claims.

The accompanying drawings show, for the purpose of exemplification without limiting the invention or the claims thereto, certain practical embodiments illustrating the principles of this invention wherein:

Figure 1:
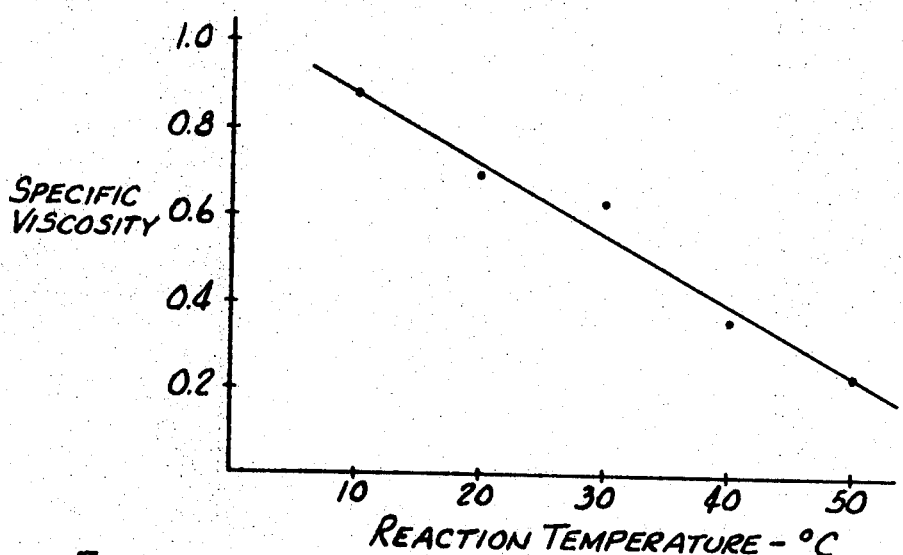
FIG. 1 is a graphic illustration of the relationship between the reaction temperature and the specific viscosity of the polymer produced by the method comprising this invention.

In explaining the method of the present invention for producing polyamic acid or ester, a background is necessary in understanding the reactant make-up and the results obtained during reaction.

The linear polymeric composition involved in the production of the polyamic material is characterized by a repeating unit which is represented by the Formula I given below.

(I)
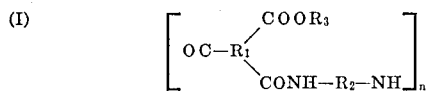

Through sintering or heat treatment, the linear polymeric composition having the structure represented by the Formula I is readily converted to the repeating unit represented by Formula II shown below.

(II)
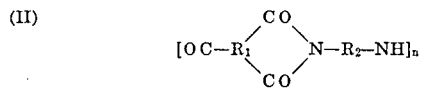

In the Formulas I and II, $R_1$ denotes a trivalent radical, and $R_2$ and $R_3$ divalent and monvalent radicals, respectively.

When the linear polymer is used as an insulating varnish, a linear polymer having the repeating unit of Formula I is dissolved in a suitable solvent. An insulated electric wire is manufactured by applying the solution of the polymer, thus obtained, to the surface of an electrical conductor and thereafter baking the insulation coating in situ by the convention methods now used. The composition of the film on the insulated electric wire manufactured in accordance with the method comprising this invention is characterized by the repeating unit of a group consisting of tricarboxylic acid and diamine and has the repeating unit structure as shown n Formula II above.

The tricarboxylic acid anhydride mono-acid halide used in the present invention has the structure of Formula III shown below.

(III)
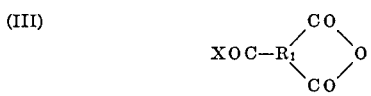

The tricarboxylic acid mono-ester diacid halide has the structure of Formula IV shown below.

(IV)
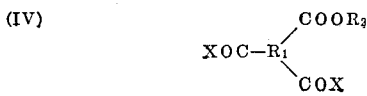

In these formulas, X denotes a halogen atom, such as fluorine, chlorine and bromine, and $R_1$ denotes a trivalent radical having at least two carbon atoms, which is preferably aromatic. $R_2$ denotes H-atom or a monovalent group having at least one carbon atom, which may be aromatic, aliphatic, alicyclic or a combination thereof.

$R_2$ in Formulas I and II represents the skeleton of diamine, which is shown generally below.

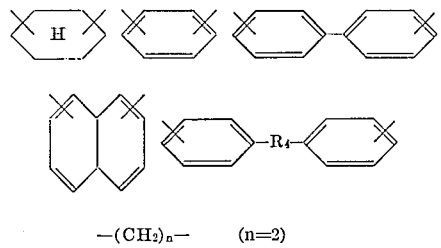

$$-(CH_2)_n- \quad (n=2)$$

Where R4 is $-CH_2-$, $-CH_2-CH_2$, $$-O-CH_2-CH_2-O-$$

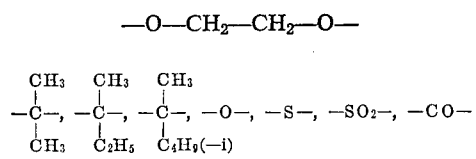

The diamine of these aromatic, aliphatic and alicyclic compounds may have a halogen atom or methoxy group, alkyl group, etc. added to a carbon atom to which an amino group is not introduced. Examples of the amines which are suitable for use in accordance with the present invention are hexamethylene diamine, ethylenediamine, m-phenylenediamine, p-phenylenediamine, m-xylylenediamine, benzidine, 3.3′-dichlorobenzidine, 4.4′-diaminodiphenylether, 4.4′-diaminodiphenylmethane, 3.3′-dichloro-4.4′-diamino diphenylmethane, 2.2-bis (4-aminophenyl) propane, (2.2-bio) 2.2-bis (4-aminophenyl)-4-methyl-pentane, 4.4′-diaminodiphenylsulfone, 4.4′-diamino-diphenyl sufoxide, 1.5 - diaminonaphthalene, 1.4 - diaminocyclohexane, ethyleneglycol-bis (4-aminophenyl) ether, and 4.4′-diamino-benzophenone.

The reaction with tricarboxylic acid anhydride monoacid halide or tricarboxylic acid mono-ester diacid halide is preferably proceeded at a temperature not exceeding 50° C. in an aromatic solvent which dissolves them, such as benzene, toluene or xylene. Although other types of solvents may be used, such as, dimethylformamide, dimethylacetamide, dimethylsulfoxide, dimethylsulfiide or a mixture of some of these solvents the aromatic solvent is preferred.

With this background, there are three possible methods of effecting the desired electrical properties in obtaining polyamic acid or polyamic ester without the formation of adduct and having suitable specific viscosity for industrial application.

In the first method tricarboxylic acid anhydride monoacid halide or tricarboxylic acid mono-ester diacid halide is initially dissolved in a solvent, such as, dimethylformamide, dimethylacetamine, dimethylsulfoxide, or in benzene or toluene (preferable) in a reaction vessel and thereafter adding diamine to the solution.

The second method is the same as the first method, mentioned above, except diamine is initially dissolved in a solvent in a reaction vessel and the tricarboxylic acid anhydride mono-acid halide or tricarboxylic acid monoester diacid halide separately dissolved in a solvent is added to diamine solution.

The third method is the placing of diamine and tricarboxylic acid anhydride mono-acid halide or tricarboxylic acid mono-ester diacid halide initially in a reaction vessel and then subsequently adding into the reaction vessel a solvent.

With respect to the first method, an adduct, as a reaction intermediate, is formed through the mutual action between tricarboxylic acid mono-acid halide or tricarboxylic acid mono-ester diacid halide, what ever the case may be, and the solvent and may have an unfavorable effect on the reaction with diamine. The formation of an adduct does not take place instantaneously, but the adduct precipitates and separates from the solvent after a certain length of time. Thus, the problem is not so much the precipitation of the adduct and the time it takes to precipitate out of solution, but rather with industrial handling and operation where large quantities of the polymer are to be produced and the adduct formed must be filtered or by some other means removed from the solution. Time is wasted, and necessarily more expense, in following this method where large quantities of the polymer are involved in permitting the polymer solution to precipitate out the adduct.

The third method is found not to be practical do to the difficulty in regulating the reaction temperature. Upon adding the solvent to the diamine-tricarboxylic acid solution, the temperature fluctuates to an undesirable degree and in order to obtain a high degree of polymerization, temperature fluctuation and temperatures in excess of 50° C. should not be permitted.

In the case of the second method, the reaction to produce the polyamic acid can be brought about without the formation of an adduct if the diamine is initially placed in a reaction vessel together with a solvent, such as, dimethylacetamide, dimethylformamide, or dimethylsulfoxide, while tricarboxylic acid anhydride mono-acid halide or tricarboxylic acid mono-ester diacid halide is seperately dissolved in an aromatic hydrocarbon solvent, such as, benzene, toluene or xylene, which does not form an adduct with the solvent, as in the case of the first method mentioned above. These two initially formed solutions are then synthesized by slowly adding them together into a reaction system. The tricarboxylic acid or ester dissolved in the aromatic solvent is compatible with the above mentioned solvents used with the diamine.

In the foregoing reaction of the second mentioned method, it is highly preferable that the constituents be weighed out accurately in equal moles. If either constituent of the diamine solution or the tricarboxylic acid or tricarboxylic ester solution is placed in synthesis with the other in an excess molal amounts, a polymer of low polymerization degree is obtained. Low polymerization produces an inferior polymer not having desired heat resistant properties as well as developing pinholes during sintering.

As mentioned, the adduct formed is a reaction intermediate. The adduct that may result may be illustrated in the following example.

When 5.6 grams of 4-chloroformylphthalic anhydride is completely dissolved in 10 grams of dimethylacetamide, as a solvent in accord with the first above method, a light yellowish white precipitation occured upon permitting the solution to stand for three hours at room temperature. The precipitated adduct was suction filtered from the solution and upon being dried weighed 10.3 grams. Calculated from the yields of this adduct, it was found that 2 mols of the solvent coordinated to 1 mol of 4-chloroformylphthalic anhydride.

In order to obtain a polyamide that has a high degree of polymerization and yet does not produce an adduct during the reaction period, it is highly important to effect full control of the temperature for the reaction, and, this, where the polyamide is to be produced on a commercial scale. The necessary temperature control of the reaction system is based on the relationship between the reaction temperature and the specific viscosity of the polymer produced as illustrated in FIG. 1. As can be seen from FIG. 1, a strict temperature control is necessary in order to obtain a polymer of a high polymerization degree.

In order to maintain as low as possible the reaction temperature of FIG. 1 and at the same time eliminate the formation of an adduct, the reactants, the tricarboxylic acid anhydride mono-acid halide and diamine, are first dissolved separately in solvents and then gradually mixed together to produce the desired reaction of Formula I. The solvent to be used to dissolve the tricarboxylic acid anhydride is benzene or toluene. The outside of the reaction vessels are maintained cool with use of a water jacket through which there flows water and ice. The dissolved tricarboxylic acid anhydride may be placed in a dropping funnel and while thoroughly stirring the diamine solution in the reaction vessel, dropped slowly therein from the dropping funnel. The reaction temperature is controlled by the rate of flow of ice water and the rate of flow of the tricarboxylic acid anhydride mono-acid halide solution into the stirred contents of the reaction vessel.

Figure 2:
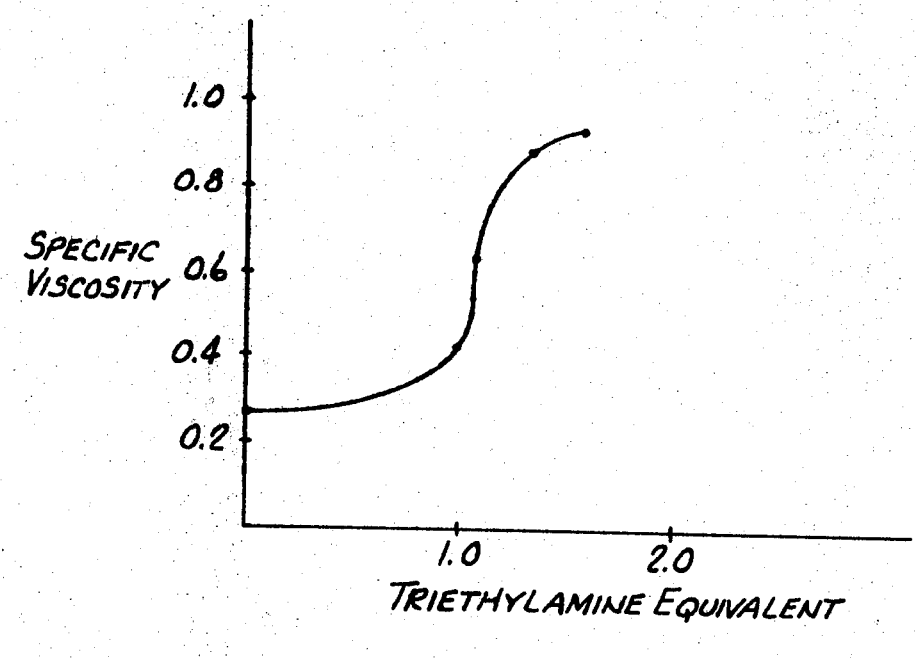
FIG. 2 is a graphic illustration of the relationship between the quantity amount of triethylamine verses the specific viscosity of the polymer produced by the method comprising this invention.

The hydrogen halide which is produced during the reaction can easily be removed by an acid acceptor, such as triethylamine or pyridine, by introducing the latter into the reaction system. The quantity equivalent of triethylamine to be introduced into the reaction system is important since it will effect the specific viscosity of the polymer produced. As shown by the illustration in FIG. 2, the triethylamine equivalent should be 1.1 times or more of the equivalent quantity of the hydrogen halide to be removed from solution.

Also a solvent having an acid accepting capacity, such as dimethylformamide or dimethylacetamide, can be used to remove the hydrogen halide and this can be precipitated out of solution in the form of the salt of triethylamine or pyridine by adding the triethylamine or pyridine before the completion of the reaction of the combined reactants.

An example of tricarboxylic acid anhydride monoacid halide that may be used in the practice of the method herein disclosed is 4-chloroformyl-1.2-benzene-tricarboxylic anhydride which is obtained through the reaction of 1.2.4-benzenetricarboxylic acid-1.2-anhydride with a chlorinating agent, such as thionyl chloride or phosphorus pentachloride.

Examples of tricarboxylic acid mono-ester diacid halide are 2-alkoxycarbonyl terephthaloyl chloride and 4-alkoxycarbonyl-isophthaloyl chloride obtained through the reaction of 2-alkoxycarbonyl-terephthalic acid or 4-alkoxycarbonyl-isophthalic acid, respectively, with a chlorinating agent, such as, thionyl chloride, phosphorus trichloride or phosphorus pentachloride.

Examples of an ester that may be employed under the method herein disclosed are the lower alkyl esters of methyl, etyhl, etc., and phenyl ester, benzylester, etc., that is, 2-methoxycarbonyl-terephthaloyl chloride, 4-methoxycarbonyl-isophthaloyl chloride, 2-ethoxycarbonyl-terephthaloyl chloride, 4-ethoxycarbonyl-isophthaloyl chloride, 2-phenoxycarbonyl-terephthaloyl chloride, 4-phenoxycarbonyl-isophthaloyl chloride, 2-benzoxycarbonyl-terephthaloyl chloride and 4-benzoxycarbonyl-isophthaloyl chloride.

The polymer obtained through the reaction between 4-chloroformyl-1.2-benzene-dicarboxylic anhydride and an aromatic diamine is extremely resistant to heat and its properties are not affected in the air at a temperature not exceeding 300° C. and in nitrogen at a temperature not exceeding 400° C. If the polymer is heated to 200° C. or higher, the change from Formula I to Formula II, above mentioned, takes place, so that the polymer is no longer soluble in a solvent. The insulating film produced by applying and baking the the polymer to an electrical conductor or magnet wire exceedingly excellent quality in its resistance to heat and is also highly flexible and, in addition, it also has exceedingly excellent quality in its resistance to chemicals, resistance to solvents, resistance to refrigerating agents and resistance to styrene, which is superior to any magnet wire or conductor heretofore manufactured.

The products that can be obtained by applying this polymer solution to a glass fabric and thereafter drying the same have excellent properties of resistance to heat and to chemicals. The polymer may also be used for linings to protect metals and also as a bonding agent for metals.

The invention may be more clearly understood and appreciated by reference to the following examples which illustrate specific embodiments and aspects thereof and should not be construed to limit the invention to any manner or form.

EXAMPLE 1

In a 100 cc. 4-necked flask which was fitted with a stirrer, thermometer, dropping funnel and condenser capped with a calcium chloride tube, there was placed 4.21 gr. (0.02 mole) of 4-chloroformyl-1.2-benzene dicarboxylic acid anhydride (M.P. 68–70° C.) and 15 cc. of benzene and the mixture was stirred thoroughly. A solution of 2.16 gr. (0.02 mole) of m-phenylenediamine in 10 cc. of dimethylacetamide was added slowly from the dropping funnel and the temperature of the reaction system in the flask was maintained below 50° C. Stirring was continued for 10 hours to complete the reaction to form the polymer solution. Then 1.5 gr. (0.025 mole) of triethylamine was added and stirring was continued; hydrochloric acid produced by the reaction was dissolved in dimethylacetamide which reacted with the triethylamine to form triethylamine hydrochloride and this salt was precipitated from the reaction system. This could be separated from the polymer solution by means of filtering.

The resulting polymer solution was applied over an aluminum foil having a 5 cm. width, 12 cm. length and 0.01 mm. thickness and was baked at 250° C. after heating for 1 hour at 100° C. to completely remove the solvent from the polymer as applied to the foil. The aluminum foil was dissolved completely with dilute hydrochloric acid leaving the polymer film. This film did not show any thermal softing point at temperatures as high as 360° C., and was insoluble in dimethylacetamide leaving a film having excellent thermal and solvent resistance as insulating material for magnet wire.

EXAMPLE 2

A polymer solution was obtained with 4.21 gr. (0.02 mole) of 4-chloroformyl-1.2-benzene-dicarboxylic acid anhydride and 3.97 gr. (0.02 mole) of 4,4'-diaminodiphenylmethane and produced into a film in the same manner as explained in Example 1. The film was found not to show any thermal softing point at temperatures as high as 360° C. and possess an excellent resistance to solvents.

EXAMPLE 3

A polymer solution was prepared in the same manner as in Example 1 from 5.26 gr. (0.025 mole) of 4-chloroformyl-1.2-benzene-dicarboxylic acid anhydride and 5.01 gr. (0.025 mole) of 4,4'-diaminodiphenylether and 40 cc. of dimethylacetamide, and a film was then produced in the same manner. No change in the appearance of the film was observed even after it had been exposed at a temperature of 300° C. for 3 hours. Nor was the flexibility of the film impaired by such a temperature subjection. The film did not show any softing point at a temperature of 360° C. When the film had been immersed in dimethylacetamide, dimethylsufoxide, m-cresol, ethylenedichloride, etc., for 100 hours at room temperature, no change in the characteristics of the film was observed.

EXAMPLE 4

In a 300 cc. 4-necked flask, which was fitted with a stirrer, thermometer, dropping funnel and condenser capped with calcium chloride tube, there was placed 9.2 gr. (0.05 mole) of benzidine and 150 cc. of dimethylacetamide. Separately, 6.9 gr. (0.05 mole) of 4-chloroformyl-1.2-benzene-dicarboxylic acid anhydride dissolved in 10 cc. of dry benzene was dropped with stirring into the flask through the dropping funnel. At this time, the reaction vessel was cooled with ice and water and the temperature was controlled so as not to allow the temperature in the reaction system to rise above 10° C. Stirring was continued for 10 hours in order to complete the reaction. 6 gr. (0.06 mole) of triethylamine was then added. When triethylamine hydrochloride separated out, the viscosity of the reaction system rapidly increased. Stirring was continued for additional 2 hours and the reaction was completed upon removing of the triethylamine hydrochloride.

A film was obtained by baking the polymer solution for 1 hour at 250° C. A thermal softing point was not evident even upon heating to 360° C. It was not soluble in dimethylformamide, dimethylacetamide and dimethylsulfoxide.

EXAMPLE 5

12.4 gr. (0.05 mole) of 4.4'-diaminodiphenylsulfoxide was dissolved in 35 cc. of dimethylacetamide. Separately, 6.9 gr. (0.05 mole) of 4-chloroformyl-1,2-benzenedicarboxylic acid anhydride was dissolved in 10 cc. of dry benzene. A polymeric composition was obtained by causing these solutions to react with each other in the same manner as set forth in Example 4. The film obtained from this polymer solution, was highly flexible and was excellent in its chemical resistance property.

EXAMPLE 6

In a 1-l. 4-necked flask, which fitted with a stirrer, thermometer, dropping funnel and condenser capped with calcium chloride tube, there was placed 39.65 gr. (0.2 mole) of 4,4'-diaminodiphenylmethane and 250 cc. of dimethylacetamide. The flask was cooled with ice water, and a separately prepared solution of 42.1 gr. (0.2 mole) of 4-chloroformyl-1,2-benzene dicarboxylic acid anhydride in 70 cc. of dry benzene was added by dropping the same slowly with constant stirring. As 4-chloroformyl-1,2-benzene dicarboxylic acid anhydride was added, an exothermic reaction took place, and the temperature in the reaction system was maintained below 50° C. Stirring was continued for 5 hours to effect the reaction completely. 22 gr. (0.22 mole) of triethylamine was then slowly added. The triethylamine hydrochloride salt produced was separated out and removed producing a viscous polymer solution. The polymer had an intrinsic viscosity of 0.7 (in dimethylacetamide at 30° C.). A solution of the polymer was coated and baked on a 1.0 mm. round copper wire by a conventional wire-enamelling procedure. The wire thus insulated has excellent thermal and solvent resistance and a high degree of flexibility. The properties of this wire are shown in Table 1 below in comparison with the properties for a polyester coated wire.

EXAMPLE 7

A viscous polymer solution was obtained by reacting 42.1 gr. (0.2 mole) of 4-chloroformyl-1,2-benzenedicarboxylic acid anhydride dissolved in 700 cc. of dry benzene and then reading 40.0 gr. (0.2 mole) of 4,4-diaminodiphenylether dissolved in 250 cc. of dimethylacetamide and thereafter reading these solutions with each other in the same manner as explained in Example 6. A film was produced from the viscous polymer solution in the same manner as explained in Example 1. This film was tough and highly flexible, and at the same time did not soften when heated to a temperature of 360° C. The film did not dissolve in such solvents as acetone, m-cresol and dimethylacetamide.

The polymer had an intrinsic viscosity of 0.8 (in dimethylacetamide at 30° C.). The polymer solution was coated and baked on a 1.0 mm. round copper wire. The insulated wire having excellent thermal and solvent resistance and a high degree of flexibility. The properties of this wire are shown in Table 1 below in comparison with the properties for a polyester coated wire as well as those for coated wire of Example 6.

TABLE 1

|  | Example 6 | Example 7 | Polyester wire |
|---|---|---|---|
| Bare (mm.) | 0.998 | 0.998 | 1.000. |
| Enameled (mm.) | 1.072 | 1.074 | 1.076. |
| Build (mm.) | 0.037 | 0.038 | 0.038. |
| Flexibility: | | | |
|   Quick snap | Good | Good | Good. |
|   Pin-hole, 1-X wrap in $H_2O$ | do | do | Do. |
| Heat shock: | | | |
| Wire wound on own diameter mandrel and their multiple, and aged 2 hrs. at following temperature: | | | |
|   250° C | 1-X good | 1-X good | 2-X good (150° C°). |
|   300° C | do | do | 5-X good (180° C°). |
| Wire prestretched 20%, wound own diameter mandrel and their multiple, and aged 2 hrs. at following temperature: | | | |
|   250° C | do | do | |
|   300° C | 2-X good | 2-X good | |
| Cut-through temperature, 4 point crossing, load 5 kg. 1° C/2. min. up. | 350° C | 350° C | 255° C. |
| Heat aging, wound on own diameter mandrel and their multiple after aged 24 hrs. at 400° C. | 1-X good | 1-X good | 2-X good. |
| Abrasion resistance, repeated scrape (600 gr. load) (av.) | 44 | 41 | 53. |
| Break down voltage; twisted pair method (kv.) | 11.0 | 11.0 | 12.0. |
| Solvent resistance: | | | |
| 50° C.-24 hrs.: | | | |
|   Benzene | Good | Good | Good. |
|   m-Cresol | do | do | Slightly swelling. |
|   Dimethylacetamide | do | do | |
|   Dimethylsulfoxide | Slightly swelling | Slightly swelling | |
| 120 °C-4 hrs.: Styrene | Good | Good | Swelling. |
| Refrigerating agent resistance, Blister in R-22 | do | do | Blister. |
| Chemical resistance, room temp.—24 hrs. immersion: | | | |
|   $H_2SO_4$ (d=1.2) | do | do | Good. |
|   NaOH (3%) | do | do | Slightly swelling. |

EXAMPLE 8

172 grams of benzylalcohol and 57.6 gr. of trimellitic acid anhydride were placed in a 500 cc. roundbottomed flask and heated to 200° C. for a period of 1 hour, and homogeneous solution was obtained. After said solution was cooled, 100 cc. of water were added and the mixture was heated to dissolve the unreacted trimellitic acid anhydride into the water layer producing trimellitic acid. The mixture was then cooled and shaken with the addition of ether. From the either layer, a mixture of 2-benzoxy-terephthalic acid and 4-benzoxy-isophthalic acid was obtained which was purified by recrystallization from water.

The melting point of the mixture of these acids was from 194 to 203° C. and the acid number was 375. The mixture of acid was refluxed with an excess of thionyl chloride for 3 hours producing trimellitic acid monobenzylester diacid chloride. This was purified by exchanging thionyl chloride for dry benzene. In a 300 cc. 4-necked flask which was fitted with a stirrer, thermometer, dropping funnel and condenser capped with calcium chloride tube to prevent moisture in the atmosphere from entering the reaction system, there was placed 9.2 gr. (0.05 mole) of benzidine and 150 cc. of dimethylformamide. Separately, 16.8 gr. (0.05 mole) of the mixture of previously obtained 2-benzoxycarbonyl-terephthaloyl-chloride and 4-benzoxycarbonylisophthaloyl chloride was dissolved in 20 cc. of dry benzene. The solution was then dropped through the dropping funnel into the reaction flask. At this time, the reaction system was cooled with ice and water to maintain a reaction temperature not exceeding 10° C. The reaction was completed within 2 to 3 hours and 12.0 gr. of triethylamine was then added to remove hydrogen chloride produced by the reaction. The triethylamine hydrochloride salt, thus produced could be eliminated by filtering. The polymer obtained by the above-described method, had an intrinsic viscosity of 0.8 (in dimethylacetamide at 30° C.).

EXAMPLE 9

Fourty-eight grams of trimellitic acid anhydride and 250 cc. of absolute methanol were placed in a 500 cc. round-bottomed flask and heated for about 1 hour at the boiling point of methanol. The excess methanol was then removed and the residue was recrystallized from water. 2-methoxycarbonyl-terephthalic acid was, thus, obtained. The yield of this acid was more than 70%. The melting point of the acid was 210–212° C. and its acid number was 500. Then, 4-methoxy-carbonyl-isophthaloyl chloride was obtained by heating it with an excess of thionyl chloride for 1 hour at the boiling point of thionyl chloride. This was purified by the same method as previously explained in Example 8.

Then, 10.0 gr. (0.05 mole) of 4,4'-diaminodiphenyl-ether and 13.06 gr. (0.05 mole) of 4-methoxycarbonyl-isophthaloyl chloride were placed into reaction with each other and a polymer was produced in the same manner as explained in Example 8. The 20% dimethylformamide solution of this polymer was found to be viscous, and a transparent coating film could be obtained by applying the polymer to an aluminum or copper foil and thereafter baking it in situ.

The film thus obtained is highly flexible and show no thermal softing point when heated to a temperature of 360° C.

We claim:
1. The method of manufacturing a polymer having a high degree of polymerization comprising:
   (1) dissolving a tricarboxylic acid anhydride mono-acid halide represented by the formula

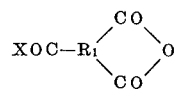

radical having six to twenty carbon atoms, in an or-iodine and $R_1$ represents an aromatic or alicyclic radical having six to twenty carbon atoms, in an organic solvent selected from the group consisting of benzene, toluene, xylene, and aromatic naphtha, to form a first solution;
   (2) separately dissolving an organic primary diamino compound having two to twenty carbon atoms in an organic solvent selected from the group consisting of dimethylformamide, dimethylacetamide, diethylacetamide, and N-methyl-2-pyrrolidone, to form a second solution;

(3) thereafter gradually bringing equal molal amounts of the two solutions together to form a reaction mixture, and maintaining the temperature of the reaction mixture below 50° C. while the reactants in said two solutions react with each other to form the desired polyamic acid polymer; and (4) introducing into the reaction mixture, triethylamine in an amount of at least 1.1 times the equivalent molecular weight of hydrogen halide by-product to be removed from the reaction mixture before the polymer forming reaction is completed.

2. The method of claim 1 including the step of filtering out hydrogen halide formed as a reaction product from the remainder of the reaction mixture.

3. The method of manufacturing a polymer having a high degree of polymerization comprising the steps of:

(1) dissolving tricarboxylic acid mono-ester diacid halide represented by the formula of

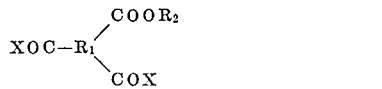

wherein X represents fluorine, chlorine, bromine or iodine, $R_2$ represents an alkyl, phenyl or benzyl radical having one to four carbon atoms, and $R_1$ represents an aromatic or alicyclic radical having six to twenty carbon atoms in an organic solvent selected from the group consisting of benzene, toluene, xylene, and aromatic naphtha, to form a first solution;

(2) dissolving an organic diamino compound containing at least two carbon atoms in an organic solvent selected from the group consisting of diamethylformamide, dimethylacetamide, diethylacetamide, and N-methyl-2-pyrrolidone, to form a second solution;

(3) thereafter gradually bringing equal molal amounts of the two solutions together to react while maintaining the temperature of the resulting mixture below 50° C.; and (4) introducing into the reaction mixture triethylamine in an amount of at least 1.1 times the equivalent molecular weight of the hydrogen halide by-product to be removed from the reaction mixture before the polymer forming reaction is completed.

4. The method of claim 1 wherein said tricarboxylic acid anhydride mono-acid halide is 4-chloroformyl-1.2-benzene-dicarboxylic acid anhydride.

5. The method of claim 3 wherein said tricarboxylic acid mono-ester diacid halide is 2-methoxy-carboxyl-terephthaloyl chloride.

6. The method of claim 3 wherein said tricarboxylic acid mono-ester diacid halide is 4-methoxy-carboxylisophthaloyl chloride.

7. The method of claim 3 wherein said tricarboxylic acid mono-ester diacid halide is a mixture of 2-methoxy-carboxyl-terephthaloyl chloride and 4-methoxy-carboxylisophthaloyl chloride.

References Cited

UNITED STATES PATENTS

| | | | |
|---|---|---|---|
| 2,421,024 | 5/1947 | Frosch | 260—78(TF)UX |
| 2,502,576 | 4/1950 | Lincoln et al. | 260—78(TF)UX |
| 3,249,561 | 5/1966 | Hendrix | 260—2.5 |
| 3,260,691 | 7/1966 | Lavin et al. | 260—30.2 |

FOREIGN PATENTS

| | | | |
|---|---|---|---|
| 570,858 | 7/1945 | Great Britain | 260—78(TF)UX |

OTHER REFERENCES

Stille, J. K., Polymer Chem., Wiley & Sons (N.Y.), pp. 95, 96, 113 (1962).

Morgan, P. W., Condensation Polymers: By Interfacial and Solution Methods, Interscience Publishers (N.Y.), pp. 7, 8 (1965).

Morgan P. W.: Condensation Polym.: By Interfacial and Solution Methods, Interscience Publ., (N.Y.), p. 120 (1965).

JOSEPH L. SCHOFER, Primary Examiner

C. A. HENDERSON, JR., Assistant Examiner

U.S. Cl. X.R.

117—126, 128.4, 132; 161—214; 260—30.2, 32.6, 33.6, 78.4